J. OLSON.
CULTIVATOR.
APPLICATION FILED NOV. 19, 1909.

1,043,246.

Patented Nov. 5, 1912.
6 SHEETS—SHEET 3.

Fig. 5.

J. OLSON.
CULTIVATOR.
APPLICATION FILED NOV. 19, 1909.

1,043,246.

Patented Nov. 5, 1912.

Witnesses:

Inventor:
John Olson,
by Bond, Adams, Pickard & Jackson
his Attys.

UNITED STATES PATENT OFFICE.

JOHN OLSON, OF BRADLEY, ILLINOIS, ASSIGNOR, BY MESNE ASSIGNMENTS, TO SEARS, ROEBUCK & COMPANY, OF CHICAGO, ILLINOIS, A CORPORATION OF NEW YORK.

CULTIVATOR.

1,043,246.  Specification of Letters Patent.  Patented Nov. 5, 1912.

Application filed November 19, 1909. Serial No. 528,933.

*To all whom it may concern:*

Be it known that I, JOHN OLSON, a citizen of the United States, residing at Bradley, in the county of Kankakee and State of Illinois, have invented certain new and useful Improvements in Cultivators, of which the following is a specification, reference being had to the accompanying drawings.

My invention relates to cultivators, and particularly to that type of cultivators in which the carrying wheels are arranged to be turned to the right or left to guide the machine to one side or the other, and the cultivating devices are simultaneously swung to one side or the other corresponding to the direction in which the wheels are turned.

It has for its object to provide certain improvements in cultivators of the type indicated, by which the weight of the cultivator gangs and of the driver are more nearly balanced when the gangs are raised to carrying position; to provide means for automatically locking the gangs against lateral movement when they are in carrying position, and also at the same time to lock the wheels so that they cannot swing laterally on their pivots; to provide improved coupling devices for connecting the front ends of the beams to the front arch; and otherwise to improve the construction of cultivators as will be hereinafter pointed out.

In the accompanying drawings, in which I have shown my improvements as applied to a cultivator in which the wheels are turned to one side or the other and the gangs correspondingly shifted by lateral movement of the seat-support,—Figure 1 indicates a side elevation of my improved cultivator, one wheel being removed, the cultivator beam being shown in operative position; Fig. 2 is a detail, being a longitudinal vertical section on line 2—2 of Fig. 5.

Figure 5:
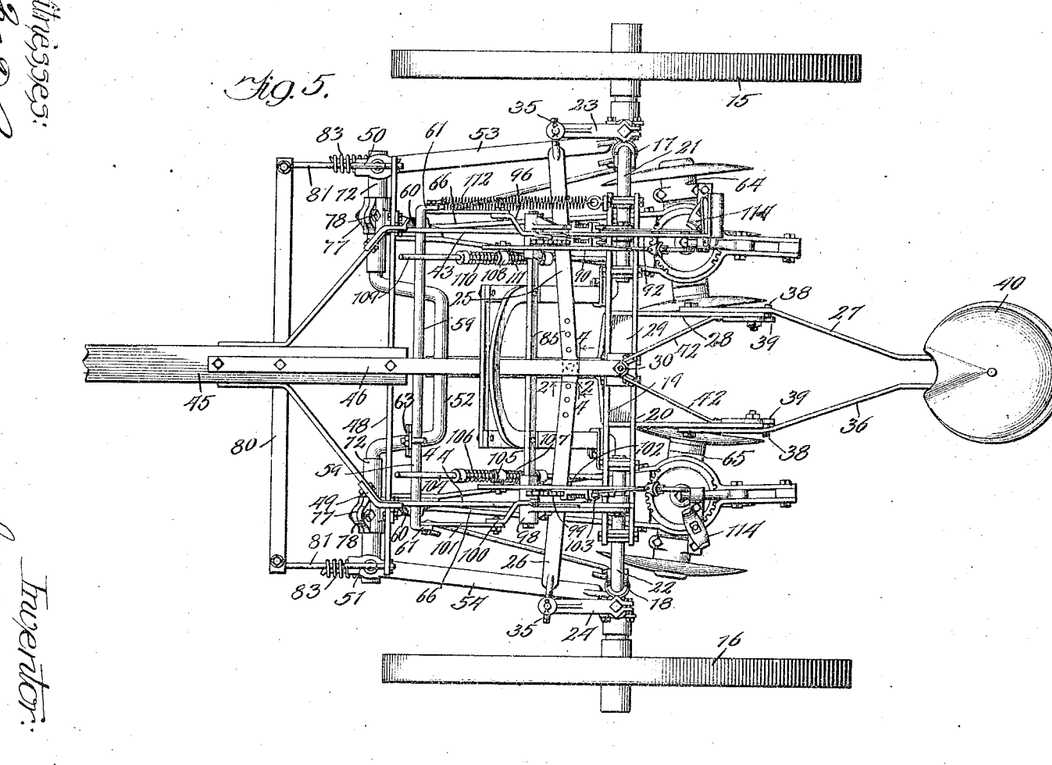
Fig. 5 is a plan view.

Referring to the drawings,— 15—16 indicate the carrying-wheels, which are mounted on spindles carried by sleeves 17—18, respectively, which are mounted in a vertical position upon the ends of the main axle. The axle is composed of an intermediate portion formed of parallel bars 19—20 secured together and spaced a suitable distance apart and end members best formed of rods 21—22 journaled between the ends of the intermediate portion of the axle, as best shown in Fig. 5. Instead of making the end members of the axle of solid rods, they may be tubular, or any other suitable construction may be employed which will permit the swinging of the axle spindles backward or forward about the main portion of the axle as a center and which will permit of the turning of the wheels to one side or the other at an angle with the line of draft. In the construction shown the sleeves 17—18 are pivoted upon the upright portions of the rods 21—22 so that the wheels may be turned freely to the right or to the left as desired.

23—24 indicate arms, which are secured to the upper ends of the sleeves 17—18 and are connected together and to the mechanism for shifting the wheels laterally by transversely-extending straps 25—26. As best shown in Fig. 5, the outer ends of the straps 25—26 are pivotally connected with the arms 23—24.

Figures 3, 4:
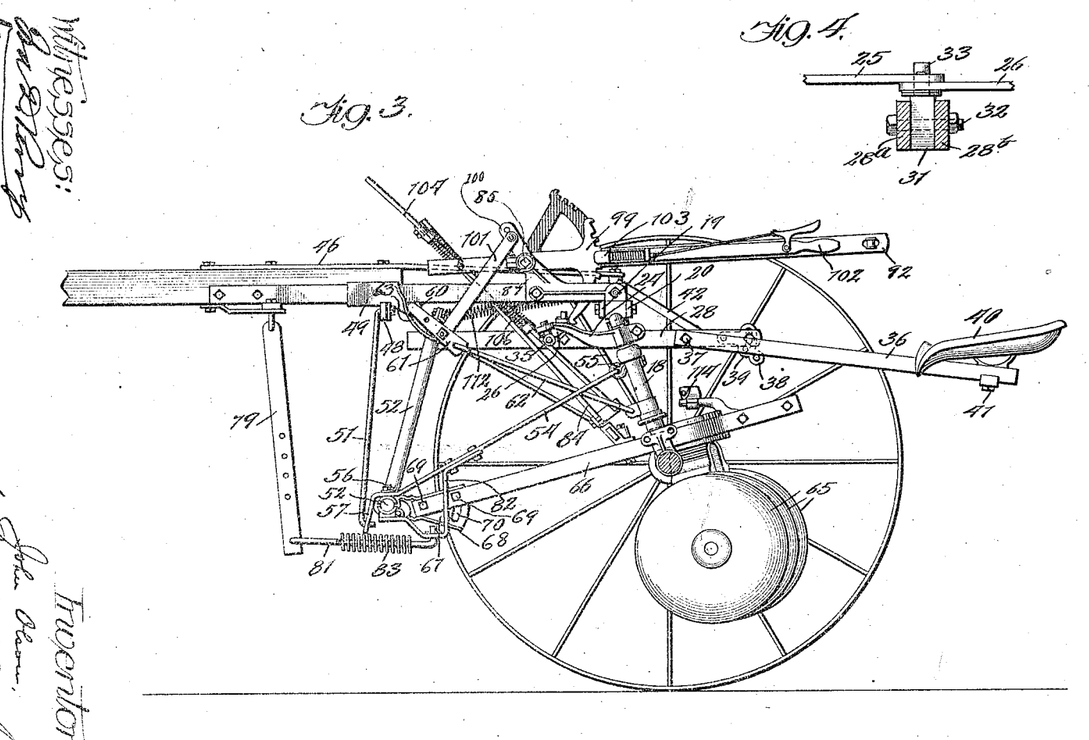
Fig. 3 is a view similar to Fig. 1 showing the gangs in carrying position.
Fig. 4 is a detail, being a cross-section on line 4—4 of Fig. 5.

27 indicates a seat-supporting frame, which is composed of two members pivotally connected together. The inner member is composed of a Y-shaped frame 28, which carries a plate 29 pivoted at 30 to the center of the main axle. The stem of the Y-shaped frame 28 extends forward from the pivot 30, being composed of two straps 28$^a$—28$^b$, as shown in Fig. 4. At a point forward of the pivot 30 said straps 28$^a$—28$^b$ support a block 31, which is held in place by a bolt 32, as shown in Fig. 4, and projects upward above the side edges of the straps 28$^a$—28$^b$, as best shown at 33 in Fig. 4. This upwardly-projecting end of the block 31 is circular and forms a pivot-bolt upon which the ends of the straps 25—26 are pivoted, as also shown in Fig. 4. Thus said straps 25—26 are connected together by said pivot-bolt and are also connected to the front portion of the seat-supporting frame. The bars 28ª—28ᵇ are provided with a series of holes 34 at different distances from the pivot 30 so that the extent to which the wheels are turned in one direction or the other by the swinging of the seat-supporting frame about its pivot 30 may be varied. To permit of this adjustment the outer ends of the straps 25—26 are provided with a screw-threaded connection with the arms 23—24, as shown at 35 in Fig. 5.

Figures 1, 2:
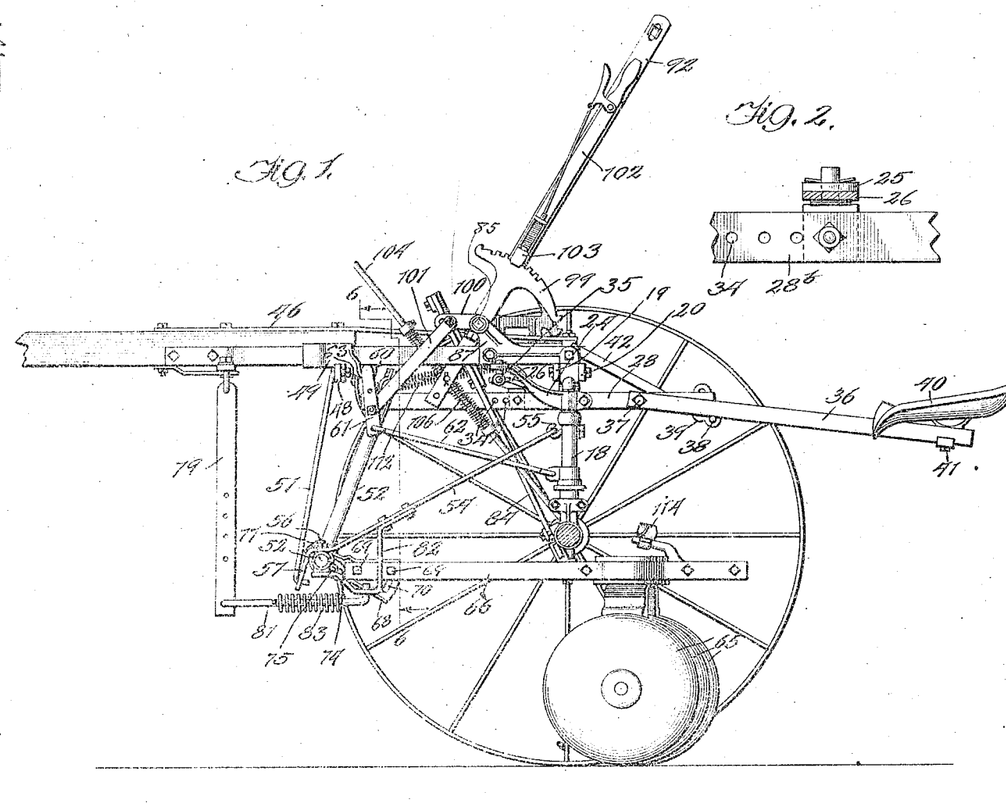

36 indicates the rear member of the seat-supporting frame, which, as best shown in Figs. 1 and 3, is pivoted at its front end to the frame 28 at points forward of the rear ends of said frame 28,— 37 indicating the pivots connecting said members of the frame.

38 indicates laterally-projecting pins, which project from brackets 39 carried at the rear ends of the member 28 of the seat-supporting frame,—said pins projecting under the rear member 36 of the seat-supporting frame, as shown in Figs. 1 and 5, and consequently forming a support for the rear portion of the seat frame.

40 indicates the seat, which is adjustably mounted on the rear portion of the member 36 of the seat-supporting frame and is movable longitudinally thereof, being held in position by a clamp 41, as shown in Fig. 1.

42 indicates braces extending from the pivot 30 to the side members of the frame 28, as shown in Figs. 1 and 5.

By this construction the rear portion 36 of the seat-supporting frame may be thrown up out of operative position when desired.

43—44 indicate side members of the frame of the machine, the rear ends of which are secured to the axle. Said side members extend forward, their front ends being bent toward each other and secured to the tongue 45, as shown in Fig. 5.

46 indicates a strap secured to the upper surface of the tongue and extending back to and connected with the axle.

48 indicates a crossbar secured to brackets 49 secured to the side members 43—44 of the frame of the machine, as shown in Figs. 1 and 5, said crossbar having laterally-swinging pendent rods 50—51 at its ends, as shown in Figs 1 and 5.

Figures 6, 7:
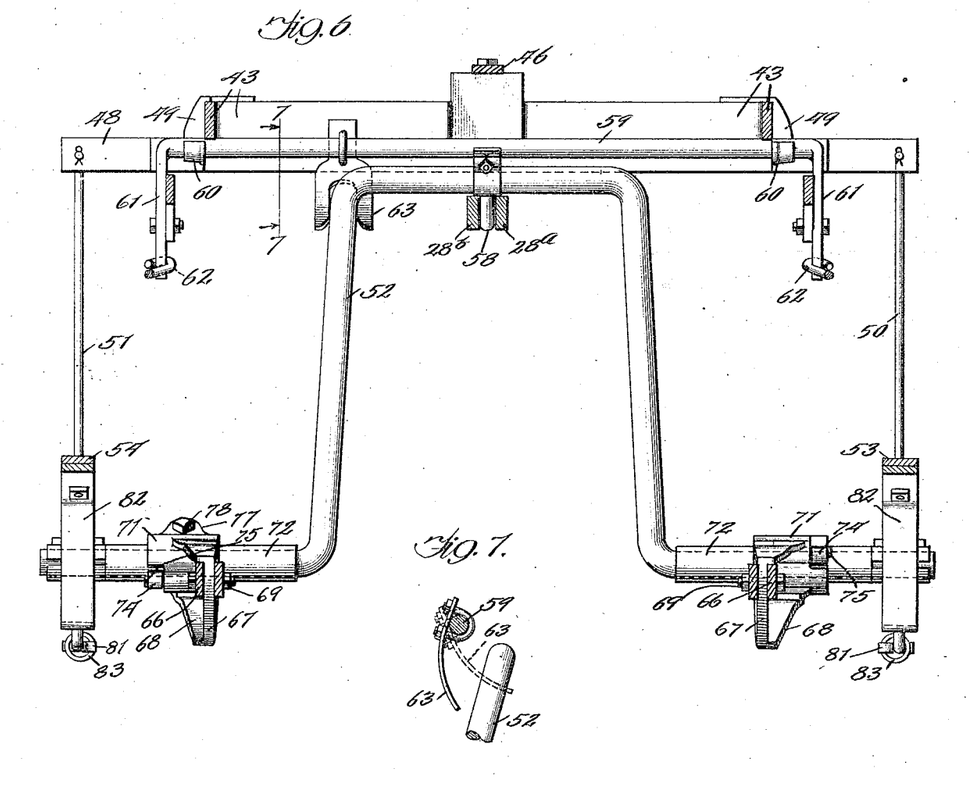
Fig. 6 is an enlarged detail, being a vertical cross-section on line 6—6 of Fig. 1.
Fig. 7 is a detail, being a vertical section on line 7—7 of Fig. 6.

52 indicates a front arch, to the horizontal end portions of which the front ends of the cultivator beams are pivotally connected, as hereinafter described. The end portions of the front arch are connected to the forward ends of thrust-bars 53—54, the rear ends of which are connected to the sleeves 17—18, respectively, as shown in Fig. 1, preferably by hooks 55, their front ends being connected to the ends of the front arch 52 by vertical bolts 56, as best shown in Fig. 1. Thus the front arch may swing laterally to carry the cultivating devices to one side or the other, as hereinafter described. The front ends of the thrust-bars 53—54 extend down in front of the ends of the front arch, as shown at 57 in Fig. 1, and the lower ends of the rods 50—51 are pivotally connected to them, as also shown in Fig. 1. The rods 50—51 serve to hold the arch down properly in position without interfering with its freedom of movement in a lateral direction. The intermediate portion of the front arch is supported by the front ends of the members 28ª—28ᵇ of the seat-support, as best shown in Fig. 6, said members extending under the central portion of the front arch 52, as shown, and being engaged by a pin 58 secured to the front arch and projecting between the members 28ª—28ᵇ. Thus the front end of the seat-support not only supports the central portion of the front arch, but also serves to move it laterally to correspond with the turning of the wheels to one side or the other.

59 indicates a rock-shaft, which extends transversely of the machine in advance of the central portion of the front arch 52, being supported by ears 60 projecting rearwardly from the brackets 49, as shown in Figs. 1 and 6. The rock-shaft has crank-arms 61 at its ends, the ends of which are connected by connecting rods 62 with the lower portions of the sleeves 17—18, as best shown in Figs. 1 and 3. The rock-shaft 59 carries a fork 63, which is fixedly secured thereto at a point opposite one of the upright portions of the front arch 52 in position to engage said arch when the shaft 54 is rocked in the proper direction, as indicated by dotted lines in Fig. 7. The purpose of the fork 63 is to engage the front arch when the cultivators are in carrying position and thereby prevent endwise movement of said arch and consequently lateral movement of the cultivating devices, and at the same time lock the wheels so that they cannot swing to one side or the other, as will more clearly hereinafter appear.

Figure 11:
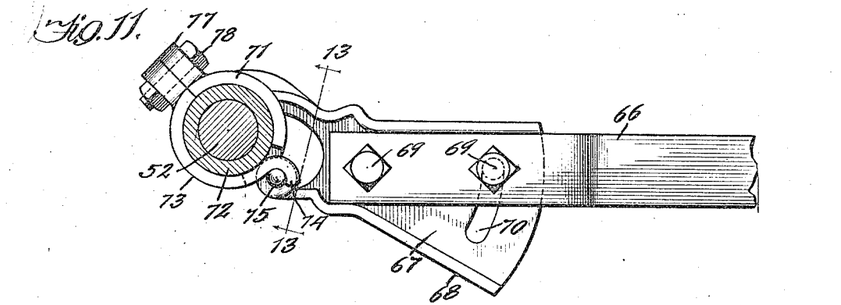
Fig. 11 is an enlarged detail of the front end of one of the beams and its connections, being a vertical section on line 11 of Fig. 12.
Figures 12, 13:
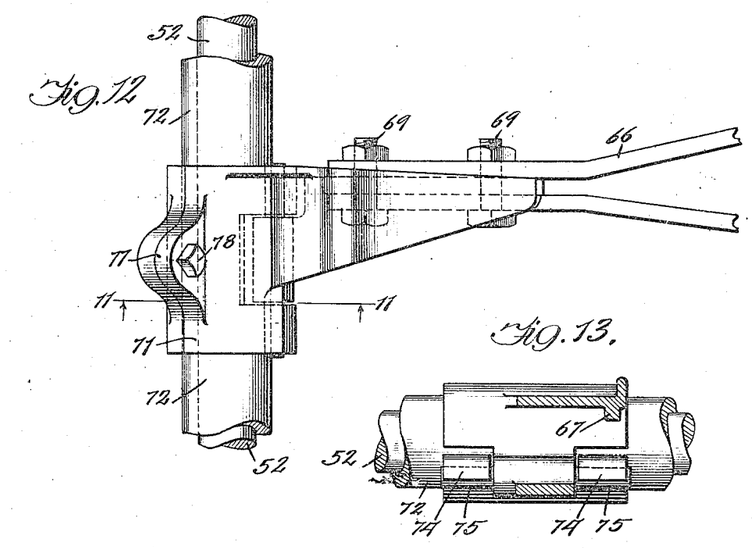
Fig. 12 is a plan view of the parts shown in Fig. 11.
Fig. 13 is a cross-section on line 13—13 of Fig. 11.

64—65 indicate gangs of cultivating devices, which, in the construction shown, are disks, but may be of any other suitable form of furrow-opener or cultivating devices. The cultivating devices are carried at the rear ends of beams 66, the front ends of which are pivotally connected with the horizontal portions of the front arch 52 so as to swing vertically but not laterally, as best shown in Figs. 11 and 12. For the purpose of so connecting the beams with the front arch 52 they are connected to the vertical web 67 of a hanger 68 by bolts 69, as best shown in Fig. 11, one of said bolts being fitted in a segmental slot 70 so that the hanger may be adjusted relatively to the beam. At its front end the hanger is provided with a semi-circular bearing 71 adapted to fit upon a sleeve or pipe-box 72 mounted on the end of the horizontal portion of the front arch.

Figure 14:
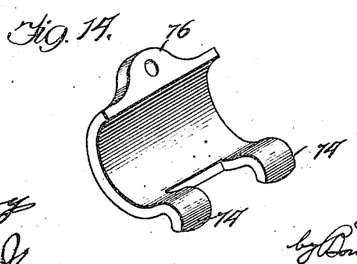
Fig. 14 is a perspective view, showing the separable member of the coupling.

73 indicates a semi-circular clamp, which coacts with the bearings 71 to encircle the sleeve 72 and secure the hanger 68 thereupon. Said clamp is of the shape shown in Fig. 14, having lugs 74 at one end which fit over the ends of a pin 75 carried by the hangers 68, as shown in Figs. 11 and 13 and having at its opposite edge an ear 76 which registers with a corresponding ear 77 carried by the bearing 71. A bolt 78 which connects said ears serves to bind the two members of the bearing together upon the sleeve 72 in the manner shown in Figs. 11 and 12.

79 indicates draft-straps depending from the ends of a draft-bar 80 secured to the tongue 45 in advance of the cross-bar 48. Said draft-straps, to which the usual swingletrees are connected, are connected by connecting-rods 81 with the thrust-bars 54 at points back of the pivots of the cultivator beams by brackets 82, as best shown in Fig. 1. Preferably the rods 81 are provided with interposed springs 83 so that the draft is yieldingly applied to the front ends of the beams through the connecting devices above described.

84 indicates a forwardly and upwardly extending rear arch, the lower ends of which are connected to the rear portions of the beams 66 and serve to hold them properly apart, assisting the front couplings in that regard.

Figures 8, 9:
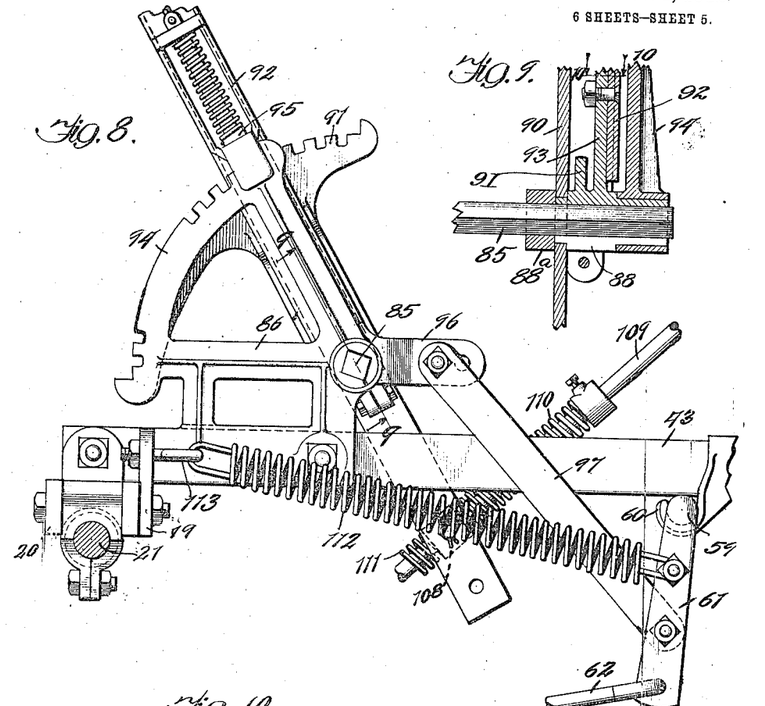
Fig. 8 is an enlarged detail, being a side view of one of the lifting levers and parts connected thereto.
Fig. 9 is a section on line 9—9 of Fig. 8.
Figure 10:
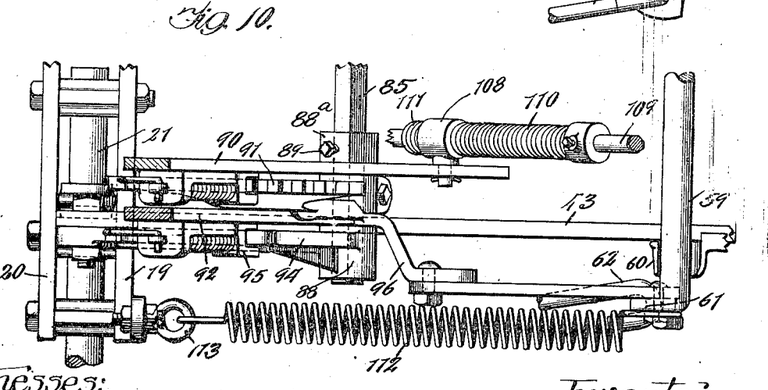
Fig. 10 is a horizontal section on line 10—10 of Fig. 9.

The cultivator gangs are lowered or raised to carry them into or out of operative position by means of lifting levers arranged so that the two gangs may be simultaneously raised or lowered, or either gang separately may be raised or lowered. The lifting mechanism comprises a rock-shaft 85 extending transversely of the machine and supported in suitable bearings in brackets 86 and 87 carried by the main frame, as shown in Figs. 1 and 8. At one end, preferably the right-hand end, as shown in Fig. 5, the rock-shaft is provided with a split sleeve 88 which is fitted thereon so as to rotate therewith, being secured in position by a set-screw 89, as shown in Fig. 10.

90 indicates a lever, which is pivotally mounted upon the sleeve 88 preferably on the end thereof which is reduced in diameter, said lever being held in position by a collar 88ª, as shown in Fig. 9, so that it may rock independently on said sleeve.

91 indicates a stationary notched segment provided on the sleeve 88 adjacent to the lever 90 and adapted to be engaged by a spring-actuated dog carried by said lever in the usual way. The arrangement is such that when the lever 90 is locked to the segment 91, the rocking of the sleeve actuates said lever to lift the gang connected to it as hereinafter described, but by releasing the dog from the rack 91 the lever 90 may be rocked independently of the rock-shaft 85.

92 indicates a lever arranged parallel with the lever 90 and fixedly secured at its lower end to an arm 93 rising from the sleeve 88, as shown in Fig. 9, so that said lever 92 is rigidly connected with the sleeve.

94 indicates a stationary notched segment, which is preferably an integral part of the bracket 86, as best shown in Fig. 8. The lever 92 is provided with a spring-actuated locking dog 95 adapted to engage the teeth of the segment 94 to lock the lever in its different positions of adjustment.

96 indicates an arm projecting angularly from the lever 92 at a point substantially in line with the rock-shaft 85, as shown in Fig. 8. Said arm is connected by a connecting-rod 97 with one of the crank-arms 61 of the rock-shaft 59, as best shown in Fig. 8. It will be apparent that when the lever 92 is drawn backward the arm 96 through the connecting-rod 97 and arm 61 will operate to rock the rock-shaft 59, thereby swinging both of its arms 61 backward and consequently moving the connecting-rods 62 backward. This will swing the vertical portions of the rear axle back, the rounded portions of the end members of the axle permitting such swinging. The effect of this operation is to throw the hubs of the wheels to the rear. This operation takes place at the same time that the gangs are lifted, as will be hereinafter explained.

98 indicates a sleeve mounted on the opposite end of the rock-shaft 85 and rotating therewith, as best shown in Fig. 5.

99 indicates a notched segment connected to and preferably formed integral with said sleeve 98.

100 indicates an arm rigidly connected to the sleeve 98 and projecting forwardly therefrom, said arm corresponding with the arm 96 at the opposite end of the rock-shaft. The arm 100 is connected by a connecting-strap 101 with the adjacent arm 61 of the rock-shaft 59, so that when the sleeve 98 is rocked it also serves to rock the rock-shaft 59.

102 indicates a hand-lever pivoted upon the sleeve 98 and having a spring-actuated dog 103 adapted to engage the rack 99. The lever 102 is connected by a connecting-rod 104 with the cultivator beam 66 at the left-hand side of the machine, preferably by means of a collar 105 which is pivoted in the lower end of said lever and slides upon the rod 104, as best shown in Fig. 5. Cushioning springs 106—107 are provided on the rod 104 above and below the collar 105, as shown. It will be apparent that by the construction described when the lever 102 is drawn back it will act to pull up on the rod 104 and consequently lift the left-hand gang. In this operation the dog 103 is, of course, released from the rack 99. Thus the left-hand gang may be independently raised and lowered by operating the lever 102. In like manner the lever 90 is connected by a collar 108 and a connecting-rod 109 similar to the rod 104 with the right-hand beam 66, cushioning springs 110—111 being provided above and below the collar 108, as shown. Thus by operating the lever 90 the right-hand gang may be raised and lowered independently. When either of the levers 90 or 102 are operated independently in the manner described, the rock-shaft 59 is not rocked as said levers have no independent connection with said rock-shaft, and consequently the position of the rear wheels is not changed. When it is desired to raise both gangs simultaneously, the lever 92 is operated, the levers 90 and 102 being in locking engagement with their respective segmental racks 91 and 99. When the lever 92 is drawn back it operates to rock the sleeve 88, which consequently actuates the lever 90 through its segmental rack 91 and the lever 102 through its segmental rack 99. At the same time the arms 96 and 100 are swung upward, thereby drawing back on both the arms 61 of the rock-shaft 59 and consequently throwing the axle spindle backward in the manner shown in Fig. 3. This operation takes place coincidentally with the lifting of the cultivator gangs, the result being that the weight of the gangs is more nearly balanced. As the draft-straps 79 are connected with the thrust-bars 53—54 by the rods 81 and said thrust-bars are connected at their rear ends with the spindle supports or sleeves 17—18 below the pivoted upper ends thereof, as shown in Fig. 1, when the gangs are out of the ground and the lever 92 is released, the draft of the team tends to rock the spindle supports so as to move the spindles forward and consequently assists in restoring the axle to its vertical or operative position. As has been explained, the rocking of the rock-shaft 59 also operates to lock the front arch 52 against lateral movement, and as the laterally-swinging seat-support is connected with said arch through the members 28ª—28ᵇ and said seat-support is also connected by the straps 25—26 and arms 23—24 with the vertical pivots of the carrying wheels, it will be apparent that by thus locking the front arch against lateral movement, the carrying wheels will simultaneously be automatically locked against lateral swinging upon their pivots. This constitutes an important feature of my invention and is a construction which is very desirable in machines of this type, since when turning at the ends of rows or on the road, if the wheels are left free to turn on their pivots and the arch is not locked rigidly against lateral movement, the entire strain is thrown upon the wheels, and unless they are made extra strong they are not apt to stand up under the strain, whereas by my improved construction the frame and wheels are practically made rigid as soon as the cultivators are raised to carrying position, and consequently the strain in turning is sustained largely by the frame. The arrangement of the operating levers so that they are drawn back to lift the gangs and also to shift the weight of the gangs when in carrying position is very desirable as it enables the operator to operate them to the best advantage.

112 indicates a spring, which assists in the operation when both gangs are lifted simultaneously, said spring being connected at its rear end with a staple 113 on the frame and at its forward end with one of the arms 61 on the rock-shaft 59, as shown in Figs. 5 and 9.

114 indicates foot-rests provided at the rear ends of the beams so that the operator may press the gangs to one side or the other when shifting the wheels and secure the necessary purchase to swing the seat-support laterally.

While I have shown and described my improvements as applied to a single-row cultivator, they may also be applied to other types of agricultural implements, and my invention is, therefore, not restricted to their embodiment in a cultivator strictly speaking.

That which I claim as my invention, and desire to secure by Letters Patent, is,—

1. In a cultivator, the combination of a frame, wheel-spindles adapted to swing backward and forward and to turn about vertical axes, wheels mounted on said spindles, a laterally-swinging lever pivotally mounted at the rear portion of the frame and extending forwardly therefrom, a transversely-movable arch, gangs having laterally-rigid connections with said arch, means connecting said lever with said arch, and means connecting said lever with said wheel-spindles for turning the same about vertical axes.

2. In a cultivator, the combination of a frame, wheel-spindles adapted to swing backward and forward and to turn about vertical axes, wheels mounted on said spindles, a laterally-swinging seat-support pivotally mounted at the rear portion of the frame and extending forwardly therefrom, a transversely-movable arch, gangs having laterally-rigid connections with said arch, means connecting said seat-support with said arch, and means connecting said seat-support with said wheel-spindles for turning the same about vertical axes.

3. In a cultivator, the combination of a frame, wheels supporting the frame, a laterally-movable front arch, cultivator-gangs connected with the front arch, means for raising the cultivator-gangs out of operative position, and means for automatically engaging and locking the front arch against lateral movement when the gangs are raised out of operative position.

4. In a cultivator, the combination of a frame, wheels supporting the frame, a laterally-movable front arch, laterally-rigid cultivator-gangs connected with the front arch, means for raising the cultivator-gangs out of operative position, and means for automatically engaging and locking the front arch against lateral movement when the gangs are raised out of operative position.

5. In a cultivator, the combination of a frame, wheels mounted to turn about vertical axes, a laterally-movable front arch, cultivator-gangs connected with the front arch, means for raising the cultivator-gangs out of operative position, and means for automatically engaging and locking the front arch against lateral movement when the gangs are raised out of operative position.

6. In a cultivator, the combination of a frame, wheels mounted to turn about vertical axes, a laterally-movable front arch, laterally-rigid cultivator-gangs connected with the front arch, means for raising the cultivator-gangs out of operative position, and means for automatically engaging and locking the front arch against lateral movement when the gangs are raised out of operative position.

7. In a cultivator, the combination of a frame, wheels mounted to turn about vertical axes, laterally-movable cultivator-gangs, means for raising the cultivator-gangs out of operative position, a laterally movable lever for moving said gangs laterally and means for automatically locking said lever against lateral movement when the gangs are raised out of operative position.

8. In a cultivator, the combination of a frame, wheels mounted to turn about vertical axes and movable backward and forward relatively to the frame, laterally-movable cultivator-gangs, means for raising the cultivator-gangs out of operative position, a laterally movable lever for moving said gangs laterally and means for automatically locking the lever against lateral movement and for moving said wheels backward relatively to the frame when the gangs are raised out of operative position.

9. In a cultivator, the combination of a frame, wheels mounted to turn about vertical axes, a laterally-movable front arch, cultivator-gangs connected with the front arch, means for raising the cultivator-gangs out of operative position, and means for automatically engaging and locking the front arch against lateral movement and for locking the wheels against rotary movement about their vertical axes when the gangs are raised out of operative position.

10. In a cultivator, the combination of a frame, wheels mounted to turn about vertical axes and movable backward and forward relatively to the frame, a laterally-movable front arch, cultivator gangs connected with the front arch, means for raising the cultivator-gangs out of operative position, and means for automatically engaging and locking the front arch against lateral movement and for moving the wheels backward relatively to the frame and for locking them against rotary movement about their vertical axes when the gangs are raised out of operative position.

11. In a cultivator, the combination of a frame, wheels mounted to turn about vertical axes, a laterally-movable front arch, cultivator-gangs connected with the front arch, a laterally-swinging lever for turning said wheels about their vertical axes and moving the front arch laterally, means for raising the cultivator-gangs out of operative position, and means for automatically locking said lever against lateral movement when the gangs are raised out of operative position.

12. In a cultivator, the combination of a frame, wheels mounted to turn about vertical axes, a laterally-movable front arch, cultivator-gangs connected with the front arch, a laterally-swinging seat-support for turning said wheels about their vertical axes and moving the front arch laterally, means for raising the cultivator-gangs out of operative position, and means for automatically locking said seat-support against lateral movement when the gangs are raised out of operative position.

13. In a cultivator, the combination of a frame, wheels mounted to turn about vertical axes, a laterally-movable lever for turning the wheels about their vertical axes, cultivator-gangs, means for raising the cultivator-gangs out of operative position, and means for automatically locking said lever to prevent lateral movement thereof when the cultivator-gangs are raised out of operative position.

14. In a cultivator, the combination of a frame, wheels mounted to turn about vertical axes and movable backward and forward relatively to the frame, a laterally-movable lever for turning the wheels about their vertical axes, cultivator-gangs, means for raising the cultivator-gangs out of operative position, and means for automatically locking said lever to prevent lateral movement thereof and for moving the wheel backward relatively to the frame when the cultivator-gangs are raised out of operative position.

15. In a cultivator, the combination of a frame, wheels mounted to turn about vertical axes, a laterally-movable front arch, laterally-rigid cultivator-gangs connected with the front arch, means for raising the cultivator-gangs out of operative position, a laterally-movable lever connected with the wheels and with the front arch, and means for automatically locking said lever against lateral movement when the gangs are raised out of operative position.

16. In a cultivator, the combination of a frame, wheels mounted to turn about vertical axes, cultivator-gangs, means for raising the cultivator-gangs out of operative position, a laterally-swinging lever for turning said wheels about their vertical axes, and means for automatically locking said wheels against rotation about their vertical axes when the cultivator-gangs are raised out of operative position.

17. In a cultivator, the combination of a frame, wheels mounted to turn about vertical axes, cultivator-gangs, means for raising the cultivator-gangs out of operative position, a laterally-swinging seat-support for turning said wheels about their vertical axes, and means for automatically locking said wheels against rotation about their vertical axes when the cultivator-gangs are raised out of operative position.

18. In a cultivator, the combination of a frame, wheels supporting the frame, a laterally movable front arch, cultivator gangs connected with the front arch, means for raising the cultivator-gangs out of operative position, a rock-shaft, locking means carried by said rock-shaft and adapted to engage the front arch to lock it against lateral movement, a lifting lever for lifting the cultivator-gangs, and means for rocking said shaft when said lifting lever is operated to lift the gangs to lock said front arch against lateral movement.

19. In a cultivator, the combination of a frame, wheels therefor, said wheels being arranged to move backward and forward relatively to the frame, a transversely-movable front arch, cultivator-gangs having laterally-rigid connections with said arch, lever mechanism for raising and lowering the gangs, a rock-shaft extending transversely at the front part of the frame, and having means for locking the front arch against lateral movement, means actuated by the rock-shaft for moving the wheels backward when said shaft is rocked in the proper direction, and means actuated by said lever mechanism for rocking said shaft to move the wheels backward when the cultivator gangs are lifted.

20. In a cultivator, the combination of a frame, wheels therefor, said wheels being movable backward and forward relatively to the frame, a front arch, cultivator-gangs connected with said front arch, a rock-shaft having means engaging said front arch when said shaft is rocked to lock the same against lateral movement, lever mechanism for lifting the gangs, means for rocking said rock-shaft when said lever mechanism is operated to lift the gangs, and means connected with said rock-shaft for moving the wheels backward when the gangs are lifted.

21. In a cultivator, the combination of a frame, wheels movable backward and forward relatively to the frame, a front arch, cultivator-gangs, having laterally rigid connections with said arch, a rock-shaft mounted on the frame and connected with the wheel supports so as to move the wheels backward when said shaft is rocked and having means for locking the front arch against lateral movement, a lifting lever connected with said gangs for lifting the gangs simultaneously, said lever being also connected with said rock-shaft to rock said shaft when the gangs are lifted simultaneously, and levers independent of said rock-shaft for lifting the gangs separately.

22. In a cultivator, the combination of a frame, wheels therefor, wheel-spindles, rocking means connecting the spindles with the frame and arranged to swing backward and forward, cultivating devices, laterally-swinging draft connections, means connecting said draft connections with said spindle supports, and means for lifting the cultivating devices out of operative position.

23. In a cultivator, the combination of a frame, axle members at opposite sides of said frame adapted to swing about horizontal axes, wheels carried by said axle members, a rock-shaft supported by said frame, said shaft having arms connected with said axle members and operating to move the wheels backward by the rocking of said shaft, a lifting lever rock-shaft mounted on said frame and having arms connected with the arms of said rock-shaft, cultivator gangs, a lifting lever mounted on said lifting-lever rock-shaft and connected with said gangs, a laterally movable front arch connecting the front ends of the gangs, and means carried by said first-mentioned rock-shaft and operating to lock said front arch against lateral movement when said rock-shaft is rocked.

24. In a cultivator, the combination of a frame, wheels therefor, wheel-spindles, rocking means connecting the spindles with the frame and arranged to swing backward and forward, cultivating devices, laterally-swinging draft connections, means connecting said draft connections with said spindle supports, and means for lifting the cultivating devices out of operative position and for moving the spindles backward when the cultivating devices are lifted.

25. In a cultivator, the combination of a frame, axle members at opposite sides of said frame adapted to swing about horizontal axes, wheels mounted on said axle members to swing about vertical axes, means for turning the wheels to one side or the other, a rock-shaft supported by said frame, said rock-shaft having arms connected with said axle members and operating to move the wheels backward by the rocking of said shaft, a lifting-lever rock-shaft mounted on said frame and having arms connected with the arms of said rock-shaft, cultivator gangs, a lifting lever mounted on said lifting-lever rock-shaft and connected with said gangs, a front arch connecting the front ends of the gangs, and means carried by said first-mentioned rock-shaft and operating to lock said front arch against lateral movement when said rock-shaft is rocked.

26. In a cultivator, the combination of a frame, axle members at opposite sides of said frame adapted to swing about horizontal axes, wheels mounted on said axle members to swing about vertical axes, a laterally-movable seat-support connected with the wheels for turning them to one side or the other, a rock-shaft supported by said frame, said rock-shaft having arms connected with said axle members and operating to move the wheels backward by the rocking of said shaft, a lifting-lever rock-shaft mounted on said frame and having arms connected with the arms of said rock-shaft, cultivator gangs, and a lifting lever mounted on said lifting-lever rock-shaft and connected with said gangs.

27. In a cultivator, the combination of a frame, axle members at opposite sides of said frame adapted to swing about horizontal axes, wheels mounted on said axle members to swing about vertical axes, a laterally-movable seat-support connected with the wheels for turning them to one side or the other, a rock-shaft supported by said frame, said frame having arms connected with said axle members and operating to move the wheels backward by the rocking of said shaft, a lifting-lever rock-shaft mounted on said frame and having arms connected with the arms of said rock-shaft, cultivator gangs, a lifting lever mounted on said lifting-lever rock-shaft and connected with said gangs, a front arch connecting the front ends of the gangs, and means carried by said first-mentioned rock-shaft and operating to lock said front arch against lateral movement when said rock-shaft is rocked.

28. In a cultivator, the combination of a frame, a rear axle comprising wheel-spindles and supports therefor, said supports being pivoted to swing to move the spindles backward and forward, cultivator beams, cultivating devices carried by said beams, laterally-swinging thrust-bars connected with the forward portions of said beams and with said spindle supports below the pivots thereof, and draft-devices connected with said thrust-bars.

29. In a cultivator, the combination of a frame, a rear axle comprising wheel-spindles and supports therefor, said supports being pivoted to swing to move the spindles backward and forward, cultivator beams, cultivating devices carried by said beams, laterally swinging thrust-bars connected with the forward portions of said beams and with said spindle supports below the pivots thereof, draft-devices connected with said thrust-bars, and means for lifting the cultivating devices out of operative position.

30. In a cultivator, the combination of a frame, a rear axle comprising wheel spindles and supports therefor, said supports being pivoted to swing to move the spindles backward and forward, cultivator beams, laterally-swinging means connected with the front ends of said beams and with the spindle supports, cultivating devices carried by said beams, and means actuated by the draft of the team for moving the rear axle into operative position.

JOHN OLSON.

Witnesses:
W. R. BOND,
C. O. MONTAGUE.